Aug. 22, 1967  J. H. BERNSTEIN ET AL  3,337,869
"V" BEAM SEMI-AUTOMATIC HEIGHT INDICATOR

Filed March 1, 1966  2 Sheets-Sheet 1

INVENTORS.
ANDREW W. GAYLORD
JOEL H. BERNSTEIN
BY Ernest J Wamberger

ATTORNEYS

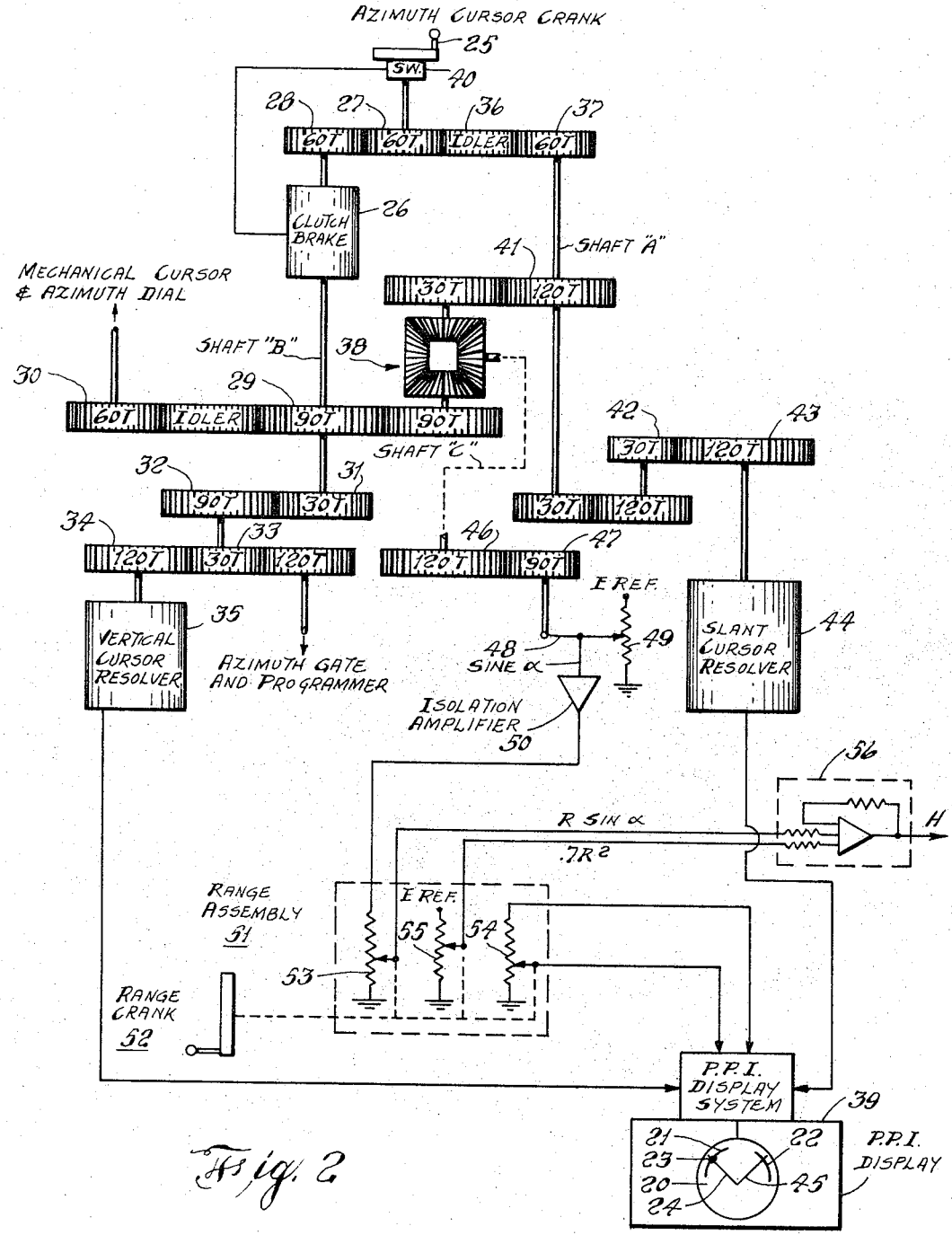

United States Patent Office 3,337,869
Patented Aug. 22, 1967

3,337,869
"V" BEAM SEMI-AUTOMATIC HEIGHT INDICATOR
Joel H. Bernstein, Glendale, Ariz., and Andrew W. Gaylord, Old Bethpage, N.Y., assignors, by mesne assignments, to the United States of America as represented by the Secretary of the Navy
Filed Mar. 1, 1966, Ser. No. 532,549
6 Claims. (Cl. 343—11)

ABSTRACT OF THE DISCLOSURE

In a V radar system which employs both vertical and slant beams and includes a PPI display there is added thereto an improved semi-automatic height indicator. This improvement permits the determination of target height through the use of a specifically gear coupled azimuth cursor which is manually controllable. The height is determined by observing the cursor settings on the PPI in conjunction with the range crank.

Figure 1:
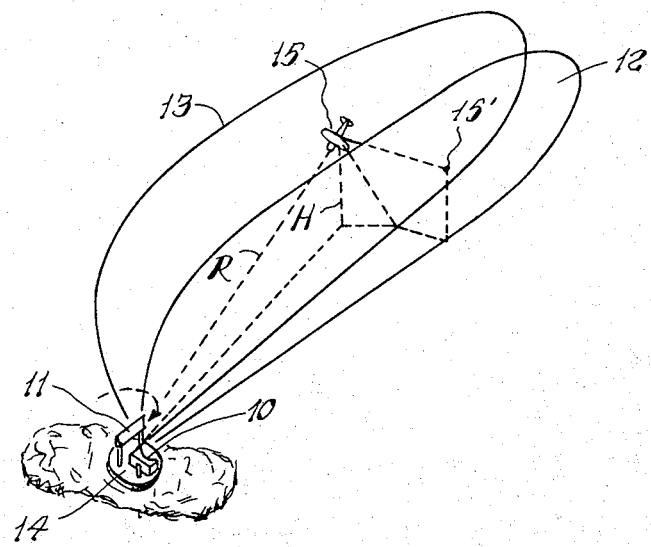

This invention relates to aircraft or object height determining apparatus employed in conjunction with V-beam radar systems and more particularly to a manual-semiautomatic height data extractor for computing the spatial position of a distant object.

V-beam radar systems are employed to obtain the spatial position of distant objects and generally involve the radiation of a pair of separate pulsed beams of radiant energy. Each beam is generated and directed by a radiator which produces a sheet-like beam pattern. The two sheet beams diverge in the vertical direction. The two beams may be displaced from one another in the azimuthal direction in that their respective intersections with the earth's surface form predetermined azimuth angles. In the most common system, one beam is vertical or perpendicular to the earth's surface and is narrow in azimuth and extensively broad in the vertical direction. The other or slant beam has the same general characteristics but is inclined at some angle to the earth's surface. This slant beam is in most cases inclined as 45° to the vertical. Both radiators are rotated together about a vertical axis while being fixed in their physical relationship to one another. Although not necessarily, the vertical beam leads the slant beam and the target at some remote spatial location is first illuminated by the vertical beam and at some instant later the slant beam impinges upon the target. Since the target is at substantially the same range (R) or distance during the time it is intercepted by both beams as they are azimuthally rotated, the separation or interval between the received echo target signals by the beams is a measure of the height or elevation of the target. The azimuth angle through which the radiators are rotated between the first illumination and the slant illumination of the target is referred to as the azimuth turn angle. This angle and the target range form the two parameters necessary for the proper determination of the target height. These parameters are automatically computed to provide or extract the required height information or there is a manual operation to provide such information. There is not, however, in the art, presently any semiautomatic arrangement for accomplishing the above-mentioned function or operation.

Accordingly, it is an object of this invention to provide an inexpensive, simple, efficient, and a reliable arrangement for the semiautomatic extraction of target height data for use in a PPI type radar indicator of the conventional V-beam radar system.

Other objects and advantages will appear from the following description of an example of the invention, and the novel features will be particularly pointed out in the appended claims.

In the accompanying drawings:
FIG. 1 is a perspective view of V-beam radar system beam pattern with a distant target and,
FIG. 2 is a block diagram of an embodiment made in accordance with the principles of this invention.

Illustrated in FIG. 1 are a pair of electromagnetic radiators or antennas 10 and 11 which are employed to produce a vertical beam 12 and a slant beam 13. The angle which the slant beam makes with the vertical beam, may of course, be any angle but, generally this is suitably arranged to be of the order of 45°. The antennas 10 and 11 are supported on a rotatable structure 14 which rotates about a vertical axis so that both beams rotate jointly with a constant geometric relation therebetween. With both beams rotating, as indicated, the radiation of beam 12 strikes a target, as, for example, an aircraft 15 first and some short instant thereafter the target is struck by the slant beam 13. As each beam strikes the target a portion of this energy is reflected back toward the antenna in the form of a target echo. These echoes are received by the antennas in approximately the same sequence as the beams impinged upon the target except for the same shift in time due to the motion of the target. Since the two beams are inclined relative to one another, the spacing between the points at the striking of the target for each beam is directly related to the height (H) of the target 15. The greater the target altitude the greater will be the azimuth spacing between the striking or illumination points (i.e. 15 and 15'). It is this property that permits the height measurement of a distant target. One general approximation of the target height (H) may be expressed as:

$$H = R \sin \alpha + .7R^2$$

where R is the range or distance from the antenna to the target, and
α is the turn angle or angular separation between the target strike points on the vertical and slant beams.

Referring now to the illustration of FIG. 2, a PPI scope display 20 has indicated thereon a vertical target 21 and a slant target 22 displaced angularly from one another and a range strobe is shown at 23. This constitutes a typical PPI display, which shows the azimuth and range of the target and is a part of the PPI display system.

In semi-automatic operation when it is desired to compute the height of a selected target as 23, the vertical cursor 24 is placed over the center of the vertical target return by rotating the azimuth cursor crank 25. This is accomplished by de-energizing the brake of the clutch-brake combination 26 and engaging the clutch. Since the gears 27 and 28 are directly coupled to the brake-clutch 26 which, in turn, is coupled to shaft B via gears 29, 30, 31, 32, 33, 34, the vertical cursor resolver 35, the azimuth dial (not shown) as well as shaft B are rotated. At the same time, shaft A is rotated via gear 27, idler 36 and gear 37. Both of these shafts are coupled to shaft C by way of differential gear 38, but since the gear train of shaft A includes an idler gear 36 its rotation is in an opposite sense to that of shaft B. Since all the gear ratios are identical, the inputs (rotation of shafts A and B) will cancel one another and there will be no output therefrom or shaft C will remain stationary.

The input shaft of the vertical cursor resolver 35 is rotated through the gear train and its output is applied to the standard PPI display system 39 and effectively rotates the vertical cursor line 24 on the display 20. The vertical cursor is rotated until it is placed over the vertical target return 23, as shown.

Switch 40, located at or on the azimuth cursor crank 25, controls the energization or activity of the brake 26 and when depressed or energized, the clutch is disengaged and its output or shaft B is locked in position. This now provides a differential rotation between shafts A and B with shaft C rotated by an amount proportional to their difference in rotation. Through gears 41, 42, and 43, the input shaft to the slant cursor resolver 44 is rotated and now the slant cursor 45 of the display 20 is rotated until it is placed directly above or over the slant target return 22. Throughout the movement of the azimuth crank 25, the vertical cursor 24 remains fixed since shaft B is locked.

Since the only input to differential gear 38 is from shaft A, its differential output via shaft C is proportional to the angular movement of the slant cursor and therefore proportional to the turn angle (angular distance between the vertical and slant targets). The differential output shaft C which represents the turn angle is directly coupled via gears 46 and 47 to the wiper arm 48 of turn angle potentiometer 49. This turn angle potentiometer is wound as a function of target height (H) vs. target range R for the particular antenna system and beam patterns. The function is approximately the sine of some angle of rotation $\alpha$. Stated another way, the wiper voltage varies with the wiper position as $H/R$ varies with turn angle. A reference voltage is applied to one terminal of the turn angle potentiometer 49 and the sine $\alpha$ turn function output is applied to an isolation amplifier 50. This amplifier serves to provide a constant output impedance for the range assembly 51. The range assembly performs multiplication of the range and turn angle function. It comprises three potentiometers each having its wiper arm coupled to the output shaft of the range crank 52 so as to provide the range function thereto. Range potentiometer 53 provides the turn angle/range multiplication, the inputs being range at the wiper shaft and turn angle as a voltage. Two additional voltages, one proportional to range, namely, range potentiometer 54, and the other proportional to range squared, range potentiometer 55, are developed. Range potentiometer 55 receives a reference voltage at its upper terminal and is wound as a square law function which produces, at the wiper contact, a voltage proportional to the square of the range selected by the range crank 52. The outputs of potentiometers 53 and 54 are coincidently applied to summing amplifier 56 whose output H is therefore equal to the sum of its inputs, namely $.7R^2 + R \sin \alpha$. The range information setting is applied from potentiometer 54 to an input of the PPI display system 39 and appears on the display 20 as a radial movement of a spot as at 23 thereon. The range crank is rotated so that the range cursor or marker is at the target return which, in effect, indicates that the crank has been set for the correct target range. When this is done, the output of summing amplifier 56 is the height of the selected target.

Summarizing, when it is desired to compute the height of a selected target, the vertical cursor is placed over the vertical target return by moving the azimuth cursor crank When this operation is taking place, the clutch brake is unenergized and the clutch is engaged. Therefore, the vertical resolver is geared directly to the azimuth cursor crank. In this condition, with the clutch energized, shafts A and B, which are the inputs to the differential gear, move at the same rotational speed but in opposite directions, and, therefore, the differential gear output, namely, shaft C, remains fixed.

The subsequent operation necessitates the energization of the clutch-brake which is accomplished by an suitable means such as a switch incorporated in or with the azimuth cursor crank. With the clutch-brake energized, the clutch is disengaged and the output shaft B is locked. The slant cursor is then placed over the slant target return by rotation of the azimuth cursor crank. Since shaft B is locked, the vertical cursor does not move and the only input to the differential gear is from shaft A. As a consequence, we have only one input to the differential gear and therefore its output appears at shaft C in the form of rotation thereof. The movement of this differential output shaft C is proportional to the angular movement of the slant cursor and is therefore proportional to the turn angle. The differential output shaft C, which represents the turn angle is directly coupled to a turn angle potentiometer whose output is $H/R$ or the sine of the target elevation angle.

Next the range crank is rotated to move the range strobe along the vertical cursor to the vertical target return. The range assembly is directly coupled to the range crank via the range potentiometers so as to derive therefrom the multiplication of range and turn angle. Derivation of earth's curvature and atmospheric refraction correction is obtained from the square function potentiometer in the form of $.7R^2$. These two outputs are summed to solve the equation $H = R \sin \alpha + .7R^2$.

It will be understood that various changes in the details, materials, and arrangements of parts (and steps), which have been herein described and illustrated in order to explain the nature of the invention, may be made by those skilled in the art within the principle and scope of the invention as expressed in the appended claims.

We claim:
1. In a V beam radar system employing vertical and slant beams and having a PPI display system that improvement in a semi-automatic height indicator which comprises:
   a gear train having a manual azimuth crank input and comprising
   a pair of output shafts coupled to said crank whose angular outputs are identical and in opposite directions,
   means for disengaging one of said shafts from said input,
   differential means coupled to said shafts for producing at its output shaft an angular rotation proportional to the difference of angular rotation of said shafts,
   a vertical cursor resolver coupled to one of said shafts and having its output connected to said PPI display system,
   a slant cursor resolver coupled to the other of said shafts and having its output connected to said PPI display system,
   a sine function potentiometer having a rotatable wiper arm contact connected for rotation with said output shaft of said differential means for producing at said arm an electrical sine function of the angular displacement thereof,
   a range assembly having a mechanical range crank input and three electrical inputs and outputs, one of said inputs for producing an output proportional to the product of its input and range and having connected to its input said wiper arm, the second of said inputs for producing an output proportional to the square of range, and the last of said outputs for producing output proportional to range,
   a summing amplifier means having its inputs connected to said product and square outputs of said range assembly,
   means connecting said last of outputs of said range assembly to said PPI display system for producing therein a range strobe,
   whereby the height of a selected target is proportional to the output of said summing amplifier means when said azimuth crank has set the cursors at said PPI display system to intersect their respective target returns and said range crank adjusted to place said range strobe over said vertical cursor and vertical target return.

2. The improvement according to claim 1, wherein said means for disengaging is a clutch-brake.

3. The improvement according to claim 2, wherein said differential means is a differential gear.

4. The improvement according to claim 3, further including switch means for controlling the activity of said clutch brake.

5. The improvement according to claim 4, further including an isolation amplifier connected between said wiper arm and said range assembly.

6. The improvement according to claim 5, wherein said range assembly includes three potentiometers each having their wiper arms mechanically coupled to said range crank, the first of said three potentiometers having the output of said isolation amplifier connected to one end terminal thereof, the second of said three potentiometers being a squaring potentiometer.

No references cited.

RODNEY D. BENNETT, *Primary Examiner.*

C. L. WHITHAM, *Assistant Examiner.*